United States Patent Office 3,520,942
Patented July 21, 1970

3,520,942
TRIFLUORO-BICYCLOBUTENES
Heinz G. Viehe, Linkebeek, Belgium, assignor to Union Carbide Corporation, New York, N.Y., a corporation of New York
No Drawing. Continuation-in-part of application Ser. No. 406,908, Oct. 27, 1964. This application Nov. 7, 1968, Ser. No. 774,164
Int. Cl. C07c 25/04
U.S. Cl. 260—648                                2 Claims

ABSTRACT OF THE DISCLOSURE

Fluoroacetylenes are disclosed. They are useful in the preparation of aminoacetylenes of known utility, and in the preparation of trimers which can be used as liquid hydrocarbon solvents.

---

This application is a continuation-in-part of application Ser. No. 406,908, filed Oct. 27, 1964 now U.S. Pat. No. 3,427,354, which was in turn a continuation-in-part of application Ser. No. 376,203, filed June 18, 1964, now abandoned.

This invention relates to aminoacetylenes and to fluoroacetylenes. The invention also relates to trimers of said fluoroacetylenes.

Aminoacetylenes, such as $C_6H_5C{\equiv}CN(C_2H_5)_2$ have been described in the literature, for example, Liebigs Ann. Chem. 1960, 638, pp. 36–41. However, the aminoacetylene compounds were obtained in very small yield.

It is an object of the present invention to provide a method for producing aminoacetylenes in good yield. It is another object of the invention to provide a process for producing aminoacetylenes by the reaction of a halogenoacetylene with an organo-nitrogen compound. A still further object of the invention is to provide a novel class of organometallic compounds useful for making aminoacetylenes.

The aminoacetylenes of this invention are those represented by the formula:

(A) 

wherein each R represents a monovalent hydrocarbon group; two R groups together can form an alkylene group, and R' represents hydrogen, a monovalent hydrocarbon group or an alkali metal.

The process for making said aminoacetylenes comprises the steps of (1) mixing together in a liquid organic solvent (a) a compound represented by the formula:

(B)         $R''{-}C{\equiv}C{-}X$ and (b) either a compound represented by the formula:

(C) 

or a compound represented by the formula:

(D) 

and (2) maintaining this mixture at a temperature between about −25° C. and about 150° C. until a compound of Formula A is produced. In the above Formulas B, C, and D, the R groups having the meanings defined hereinabove with reference to Formula A, R'' represents hydrogen or a monovalent hydrocarbon group, X represents a halogen atom, and M represents an alkali metal, namely, lithium, sodium, potassium, rubidium, cesium or francium.

The R' group in Formula A can also be defined as representing an R'' group or an alkali metal.

In the compounds of Formulas A, C, and D, the R groups can be the same or different throughout the same molecule and, as stated above, two R groups on the same nitrogen atom can together form a divalent alkylene group.

The R groups, the R' groups and the R'' groups (when either R' or R'' or both represent monovalent hydrocarbon) can be alkyl, aryl, alkaryl, aralkyl, alkenyl, alkynyl, cycloalkyl, cycloalkenyl, and the like groups. For example, R, R' and R'' can be methyl ethyl, n-butyl, tertiary-butyl, 2,2-dimethyl-n-propyl, iso-octyl, octadecyl, phenyl, phenylethyl, terphenyl, cumyl, mesityl, cyclopentyl, ethylcyclohexenyl, allyl, or butyne-2-yl groups, and the like, and two R groups on the same nitrogen atom can together be tetramethylene, 3-ethylhexamethylene, decamethylene, and the like.

In Formulas A, B, C, and D, the R groups, R' groups and R'' groups preferably contain from 1 to 18 carbon atoms and the R' groups and R'' groups are most preferably monovalent hydrocarbon groups containing from 4 to 18 carbon atoms which are bonded to the acetylenic moiety $C{\equiv}C$ thorugh a tertiary carbon atom of the R' and R'' group. As used herein, the term "tertiary carbon atom" includes a carbon atom of a benzene ring system.

Preferably, the halogen atom X is fluorine or chlorine, and chlorine is particularly preferred where R'' in the compounds of Formula B is an alkyl or cycloalkyl group.

The compounds of Formula C can also be reagents of the Grignard type, in which case, M represents the moiety MgX. Also M in Formula C can be an alkaline earth metal, namely, beryllium, magnesium calcium, strontium, or barium, in which case, two $NR_2$ moieties are associated with each M.

Typical compounds of Formula B are the following:

$HC{\equiv}CF$
$CH_3C{\equiv}CF$
$(CH_3)_3C{-}C{\equiv}CF$
$C_6H_5{-}C{\equiv}CF$
$CH_3CH_2CH_2CH_2C{\equiv}CF$
$C_6H_5CH_2CH_2C{\equiv}CF$

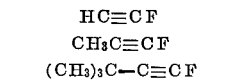

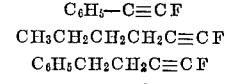

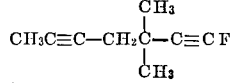

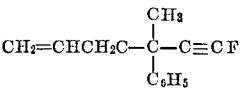

Typical compounds of Formula C are the following:

$NaN(CH_3)_2$

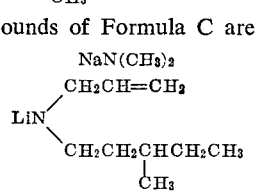

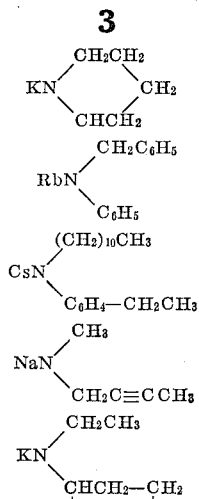

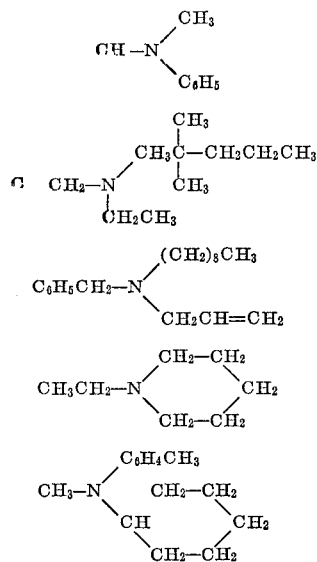

Typical compounds of Formula D are the following:

The compounds of Formula B wherein R" is a monovalent hydrocarbon group and X is fluorine are novel compounds and can be prepared by the process which can be represented by the following equations:

(1)
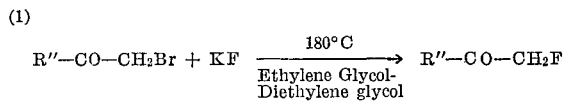

(2)
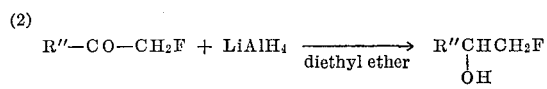

(3)
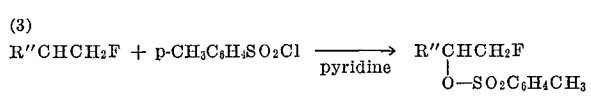

(4)
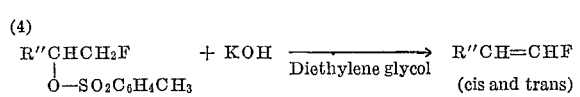

(5)
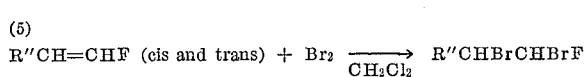

(6)
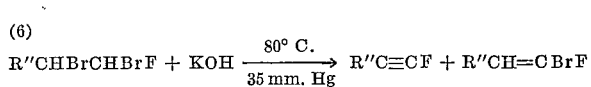

The desired product R"C≡CF is preferably isolated from the reaction mixture immediately after completion of step (6) and at temperatures below room temperature, in order to minimize polymerization of the product. The process for preparing the compounds of Formula B in which R" is a monovalent hydrocarbon is further illustrated in the examples hereinbelow.

All other compounds of Formulas B, C, and D are known and can be prepared by conventional methods.

The novel aminoacetylene compounds of this invention are those represented by Formula A wherein R' is an alkali metal. Thus, the novel compounds are those represented by the formula:

(E)
$$MC\equiv CN\begin{smallmatrix}R\\R\end{smallmatrix}$$

wherein M is an alkali metal and R has the meaning defined hereinabove. The compounds of Formula E can be prepared according to the process of this invention by the reaction of a compound of Formula B, where R" is hydrogen, with a compound of Formula C, where M is an alkali metal.

Typical novel compounds of Formula E are those having the formulas:

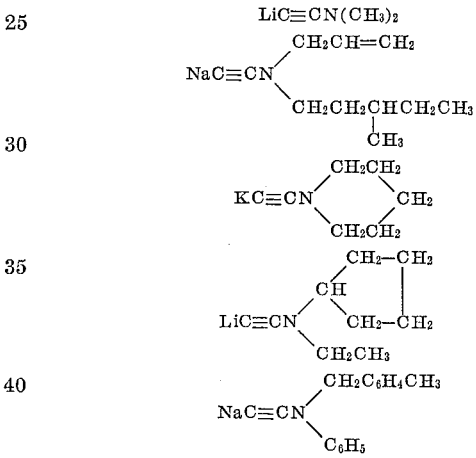

Throughout the present specification and claims, $C_6H_5$, $C_6H_4$, and $iC_4H_9$ represent the phenyl group, phenylene group, and isobutyl group, respectively.

The process of this invention for preparing aminoacetylenes can be carried out by mixing together the solvent, the compound of Formula B, and the compound of either Formula C or Formula D in any convenient order, and maintaining the reaction mixture at a temperature between —25° C. and 150° C. until a compound of Formula A is produced. Preferably the reaction mixture is stirred during the course of the reaction.

It is preferable to carry out the reaction under anhydrous conditions and in the absence of oxygen. This can be conveniently done by carrying out the reaction under an atmosphere of inert gas, such as nitrogen, argon, helium, and the like.

Organic solvents useful in the process of this invention include non-protic solvents such as hydrocarbons, hydrocarbon ethers, and tertiary amines represented by Formula D hereinabove. Illustrative solvents include hydrocarbons such as petroleum ether, cyclohexane, 2-ethylhexane, benzene, toluene, xylene and the like, and ethers such as diethyl ether, diisopropyl ether, methylbutyl ether, dioxane, tetrahydrofuran, ethylene glycol dimethyl ether, diethylene glycol dimethyl ether, and the like, and tertiary amines of Formula D hereinabove.

Where a compound of Formula D is used in the process of this invention it is convenient to use in excess of this compound as a solvent.

The process can also be carried out using a mixture of compounds of Formulas C and D, both of which will then react with the compound of Formula B to yield compounds of Formula A. For example, the reaction of C₆H₅C≡CCl with a mixture of LiN(CH₃)₂ and N(CH₃)₃ gives primarily C₆H₅C≡CN(CH₃)₂, while the reaction of C₆H₅C≡CCl with a mixture of LiN(CH₂CH₃)₂ and N(CH₃)₃ gives a mixture of C₆H₅C≡CN(CH₃)₂ and C₆H₅C≡CN(CH₂CH₃)₂. The relative amounts of products in such product mixtures depend on the relative reactivities of the compounds of Formulas C and D. In such reactant mixtures, the compound of Formula D is both a reactant and a solvent.

Where a compound of Formula D is used in the process of this invention and the R groups are not all the same, the primary product will depend on which nitrogen-R group bond is most easily broken. It has been found, for example, that a typical order of decreasing ease of R–N bond breaking is allyl-N, benzyl-N, methyl-N, ethyl-N, and n-propyl-N. Thus, the reaction of C₆H₅C≡CCl with

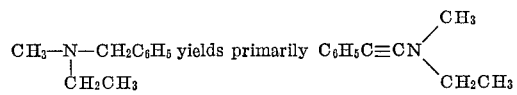

When the solvent is a hydrocarbon or hydrocarbon ether, the preferred reaction temperatures are −25° C. to 20° C., and when the solvent is a tertiary amine, higher temperatures up to 150° C. are preferred.

There is no particular advantage to be gained in carrying out the reaction at pressures other than atmospheric pressure. However, when a sealed reaction vessel is employed, the autogenous pressure of the reaction mixture at the reaction temperature is satisfactory.

Formation of the compound of Formula A in good yield generally takes from a few hours up to several days depending on the particular temperature, solvent and reactants.

It is preferable to use equimolar quantities of reactants or a slight excess of the compound of Formula C or Formula D.

The reaction product is separated from the reaction mixture by conventional methods which include separation of liquid from precipitated salts and other solids, and isolation of the desired product by evaporation of solvent, fractional distillation, and the like. Product separation is preferably carried out under an inert atmosphere. Several methods of product recovery are illustrated in the examples hereinbelow.

All of the compounds of Formula A react with hydrogen halides with the formation of hydrogen halide salts, and are therefore useful under anhydrous conditions as hydrogen halide acceptors. For example, all of the compounds of Formula A can be used as hydrogen halide acceptors in the process for producing cyclopentadienyl metal compounds described in Morehouse, U.S. Pat. 3,071,605, issued Jan. 1, 1963.

The following examples are illustrative of the invention:

EXAMPLE 1.—PHENYL-DIMETHYL-AMINOACETYLENE

C₆H₅—C≡CCl+LiN(CH₃)₂→C₆H₅—C≡C—N(CH₃)₂+LiCl

A 13.69 g. (0.1 mole) portion of phenylchloroacetylene dissolved in 30 cc. diethyl ether was allowed to drip (over a 1.5 hour period) into 0.11 mole lithium dimethylamide dissolved in 20 cc. diethyl ether. The reaction temperature was initially kept at −20° C. and is increased to +25° C. towards the end of the reaction. The ether solution was decanted from the salt which was washed out with ether. After evaporation of the ether from the combined solutions, fractional distillation of the residue gave 12.7 g. clear liquid phenyl-dimethylaminoacetylene.
Yield 87% of theoretical.
Boiling point: about 60° C./0.08 mm. Hg.

The product was identified by infrared and elemental analysis.

*Analysis.*—C₁₀H₁₁N (M.W. 145.2); C, 83.15 (calc. 82.72); H, 7.44 (7.63); N, 9.68 (9.65).

A repetition of the reaction with an increased reaction time of 113 hours at room temperature reduced the yield to 61% of theoretical.

EXAMPLE 2.—PHENYLDIMETHYL-AMINOACETYLENE

C₆H₅—C≡C—Cl+N(CH₃)₃→C₆H₅—C≡C—N(CH₃)₂+CH₃Cl

A 2.05 g. (0.015 mole) portion of phenylchloroacetylene and 10 g. (0.017 mole) trimethylamine were dissolved in 25 cc. diethyl ether under nitrogen and warmed at 40° C. for 65 hours in a sealed tube. After the salts had been centrifuged and washed with diethyl ether, evaporation of the combined solution gave a residue which on fractional distillation gave 1.2 g. phenyldimethylaminoacetylene identical with the product of Example 1.
Yield 55% of theoretical.

EXAMPLE 3.—t-BUTYL-DIMETHYL-AMINOACETYLENE (CH₃)₃C—C≡C—Cl+N(CH₃)₃→
(CH₃)₃C—C≡C—N(CH₃)₂+CH₃Cl

A 25 g. (0.43 mole) portion of trimethylamine and 20 g. t-butylchloroacetylene were heated under nitrogen in a sealed tube for 60 hours at 135° C., the trimethylamine being both reactant and solvent. After cooling and opening the tube, the product was separated from the salts by distillation on a water bath under vacuum. The 18.75 g. residue left after evaporation of the trimethylamine yielded on distillation using a fractionating column filled with helices two fractions:

(1) Fraction B.P. 92° C., 8 g. t-butylchloroacetylene
(2) Fraction B.P. 122–124° C., 5.7 g. t-butyl-dimethylaminoacetylene.

Yield, based on reacted t-butylchloroacetylene was 44% of theoretical.

The product was identified by infrared and elemental analysis.

*Analysis.*—C₈H₁₅N (M.W. 125.2); C, 76.14 (calc. 76.73); H, 12.15 (12.09).

EXAMPLE 4.—t-BUTYL-FLUOROACETLYENE AND TRIMER DERIVATIVES

To 8.7 g. potassium fluoride in 8 g. ethylene glycol and 3 g. diethylene glycol at 180° were added 17.9 g. bromopincolin, (CH₃)₃C—CO—CH₂Br [prepared following Hill and Kropa, J. Am. Chem. Soc. 55, 2509 (1933)], with stirring over a 20 min. period. The reaction was carried out in an apparatus which permitted the volatile products to distill off. The distillate was fractionated to give 1-fluoro-3,3-dimethyl-butan-2-one, (CH₃)₃C—CO—CH₂F B.P. 132° C., at 760 mm. Hg, 65% yield. Analysis of the 2,4-dinitrophenylhydrazone derivative, M.P. 116° C.: C₁₂H₁₅N₄O₄F (298.3).
Calculated (percent): C, 48.32; H, 5.07. Found (percent): C, 47.71; H, 4.72.

To a solution of 16 g. LiAlH₄ in 180 ml. dry diethyl ether at −70° C. under stirring was added dropwise over a 15 minute period 180 g. of (CH₃)₃C—CO—CH₂F dissolved in 180 ml. diethyl ether. The cooling bath was then replaced by an ice bath and the mixture kept at 0° C. for 5 minutes. In order to decompose excess LiAlH₄, 13.5 ml. methyl formate were dropped into the reaction mixture. Then a saturated solution of ammonium chloride was added dropwise, until all salt precipitated, from which the ether solution was separated by filtration. The ether was separated by careful distillation through a wire-packed column (30 cm. length) with a dephlegmator. The residue was fractionally distilled to give 1-fluoro-3,3-dimethyl-butan-2-ol ("Fluoropinacolyl alcohol"), B.P. 74° C. at 80 mm. Hg.

Yield: 127 g. or 69%.

Analysis of the p-nitrobenzoate derivative M.P. 60°: $C_{13}H_{16}NO_4F$ (269.27).

Calculated (percent): C, 57.12; H, 7.00. Found (percent): C, 57.82; H, 5.94.

To 50 g. of the fluoropinacolyl alcohol in 500 ml. dry pyridine were added 90 g. of p-toluene sulfonylchloride and the mixture heated for 15 hours at 75°. The pyridine was then distilled off under vacuum. The residue was taken up with 70 ml. diethyl ether, then washed with 50 ml. water, with 2 N $H_2SO_4$ and finally with sodium bicarbonate solution. After drying with sodium-sulfate, the ether was evaporated and the residue distilled to give fluoro-pinacolyl-alcohol-p-toluenesulfonate: B.P. 140° C. at 0.2 mm. Mg.

Yield: 89 g. or 78%.

Analysis.—$C_{13}H_{19}O_3SF$ (274.4).

Calculated (percent): C, 57.12; H, 7.00. Found percent): C, 57.43; H, 6.91.

A mixture of 178 g. of fluoro-pinacolyl-alcohol-p-toluenesulfonate, 183 g. potassium hydroxide and 200 ml. diethylene glycol was heated to 180° C. and the volatile products, including t-butylfluoro-ethylene were distilled off. A redistillation gave a cis-trans mixture of

$(CH_3)_3CCH=CHF$

B.P. (760: mm. Hg.) 55° C.

Yield: 58 g. or 88%.

Analysis.—$C_6H_{11}F$ (102.1).

Calculated (percent): C, 70.50; H, 10.87. Found (percent): C, 70.41; H, 10.78.

Fifteen g. of t-butyl-fluoroethylene were dissolved in 180 ml. dichloromethylene. Next 9.1 ml. bromine were added at 0° C. over a 2 hour period. The solvent was evaporated under vacuum and the residue distilled to give 1-fluoro-1,2-dibromo-3,3-dimethylbutane B.P. 105° C. at 35 mm. Hg.

Yield: 34.3 g. or 83%.

Analysis.—$C_6H_{11}FBr_2$ (262.0).

Calculated (percent): Br, 61.0. Found (percent): Br, 60.6.

A tube of 1.30 m. length and 30 mm. interior diameter was half filled with solid potassium hydroxide of high M.P. and under vacuum (35 mm. Hg) heated to 80° C. Over a 20 min. period 34 grams of 1-fluoro-1,2-dibromo-3,3-dimethylbutane was passed through the tube and all volatile matter condensed in a trap cooled with liquid nitrogen (—196° C.). From this trap was distilled at $10^{-4}$ mm. Hg and at —45° C. nearly pure t-butylfluoroacetylene, $(CH_3)_3C—C≡CF$. A redistillation at $10^{-4}$ mm. Hg and —70° C. (Dry Ice-acetone-bath) gave a 9% yield of t-butylfluoroacetylene. Infrared spectrographic analysis showed C≡C at 4.35 microns and C-F at 8.8 microns.

Molecular weight: (1) By gas density: Theory 100.1. Found 95.5.

(2) By field ionization-mass-spectrometry: Found: 100. Heating t-butylfluoroacetylene to room temperature gave a trimer derivative M.P. 100°, with a molecular weight of 300 (found). Analysis of the trimer derivative: $C_{18}H_{27}F_3$ (M.W. 300.4).

Calculated (percent): C, 71.97; H, 9.06. Found (percent): C, 71.91; H, 9.11.

The trimer derivative was found to be a mixture of several isomers. The main constituent of the mixture was isolated and was identified by infrared, ultraviolet and nuclear magnetic resonance spectroscopy as 1,2,3-tri-tertiary-butyl-4,5,6-trifluorobenzene, melting point 112°–114° C. In the nuclear magnetic resonance spectrum, there were two signals of relative intensity 2:1 for the fluorine atoms and for the t-butyl protons as follows:

Fluorine signals—(Reference $CCl_3F$): A doublet at +127.7 p.p.m. with relative intensity 2 and a triplet at 154.8 p.p.m. with relative intensity 1 ($J_{FF}$=19.5 cps.).

(t-Butyl)-proton signals (reference tetramethylsilane): A double doublet at —1.45 p.p.m. with relative intensity 2 and a singlet at —1.39 p.p.m. with relative intensity 1. The double doublet results from long-range coupling between protons of the exterior t-butyl groups and the fluorine atoms in o- and m-positions ($J_{HF}$ ortho ~ 0.9 cps.; $J_{HF}$ meta ~ 0.6 cps.). These couplings appear in the fluorine spectrum only as line broadening, because of the expected high multiplicity. These nuclear magnetic spectral data exclude the possible isomeric compounds with the t-butyl groups in the 1,2,4- or 1,3,5-positions.

EXAMPLE 5.—t-BUTYL-DIMETHYLAMINO-ACETYLENE

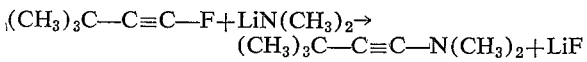

Fifty mg. (5 millimoles) t-butylfluoroacetylene, prepared as in Example 4, were condensed in vacuo in a cold trap into 6 millimoles lithium dimethylamide coated with paraffin oil. t-Butyl-dimethylaminoacetylene formed after two days standing in a refrigerator at 0° C. and was identified by infrared spectrographic analysis.

EXAMPLE 6.—LITHIUM DIMETHYLAMINOACETYLIDE AND DIMETHYLAMINOACETYLENE

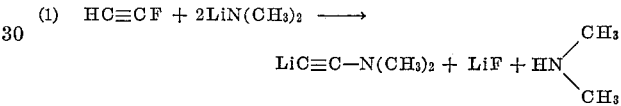

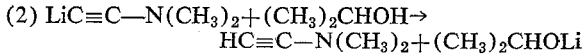

Two hundred cc. (9 millimoles) fluoroacetylene gas were distilled in vacuo into 18 millimoles lithium dimethylamide in 20 cc. diethyl ether at —196° C. On warming the ether solution to 20° C., LiC≡CN(CH$_3$)$_2$ formed and was identified by infrared spectrographic analysis. With the addition of 4 drops isopropanol, the LiC≡CN(CH$_3$)$_2$ was converted to HC≡CN(CH$_3$)$_2$ which was also identified by infrared spectrographic analysis.

EXAMPLE 7.—DIISOBUTYLAMINOACETYLENE

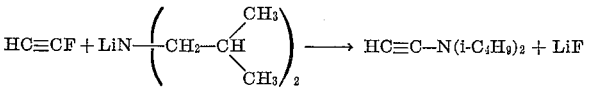

Eight hundred cc. (36 millimoles) fluoroacetylene gas were distilled onto 80 millimoles lithium diisobutylamide in about 40 cc. diethyl ether at —196° C. in vacuo. After warming to about —10° C., 1.6 g. (50 millimoles) methanol were added. The portion volatile at room temperature was distilled in vacuo into a cold trap. The residue (2 g.) was fractionally distilled under reduced pressure to give diisobutylaminoacetylene, B.P. 55° C. at 15 mm. Hg. The product was identified by elemental and infrared spectrographic analysis.

Analysis.—$C_{10}H_{19}N$ (M.W. 153.3); C, 77.16 (calc. 78.35); H, 12.31 (12.51).

The compounds and mixtures of compounds of Formula B, wherein F is fluorine and R'' is a monovalent hydrocarbon group, when warmed to room temperature trimerize to give a mixture of products. The principal primary products are those represented by the formulas:

(F)

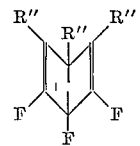

and (G) 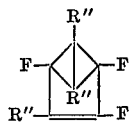

wherein R″ is a monovalent hydrocarbon group.

The compounds of Formula F can rearrange to compounds represented by the formula (H) 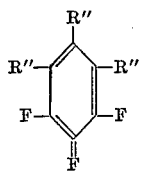

while compounds of Formula G can rearrange to compounds represented by the formula:

(I) 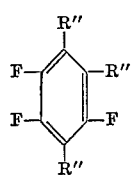

Thus the trimerization product mixture often contains mixtures of compounds of Formulas F, G, H, and I.

The generic class of trimerization products of the compounds R″C≡CF can be represented by the formula:

(J)     (R″CCF)$_3$ wherein R″ is a monovalent hydrocarbon group.

In Formulas F, G, H, I and J, R″ preferably is a monovalent hydrocarbon group free of aliphatic unsaturation.

Illustrative examples of compounds represented by the Formulas F, G, H, I and J are the following:

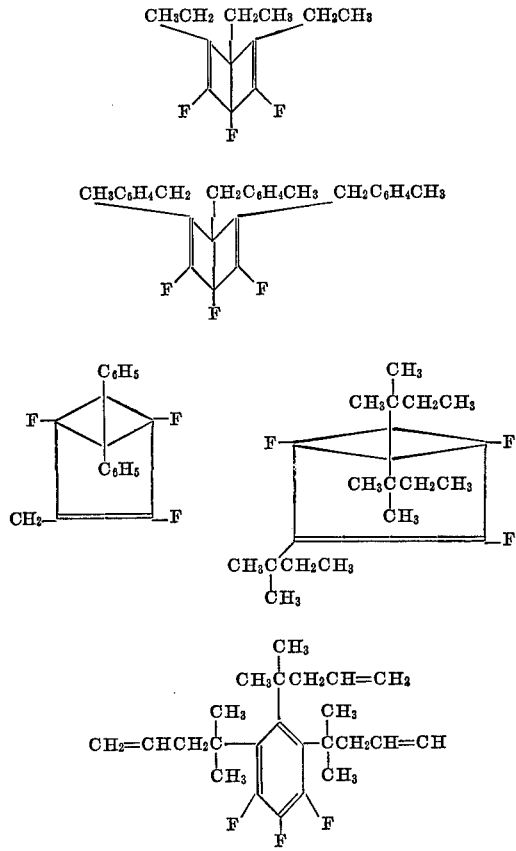

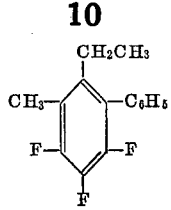

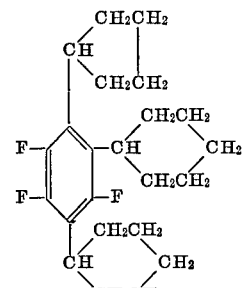

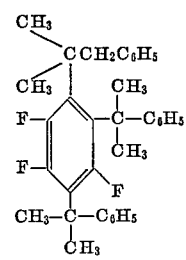

The compounds of Formulas H and I are useful as inert aromatic solvents, particularly where relatively high temperatures are required. The compounds of Formulas F and G can be converted to useful high boiling inert aromatic solvents by thermal, ionic or photochemical rearrangement. As discussed hereinabove, compounds of Formula F can rearrange to compounds of Formula H and compounds of Formula G can rearrange to compounds of Formula I.

EXAMPLE 8

Tertiary-butyl-fluoroacetylene, prepared as in Example 4, was warmed to room temperature. The resulting mixture of trimer products was separated by crystallization, gas phase chromatography, liquid phase chromatography or a combination of these methods to give the following compounds:

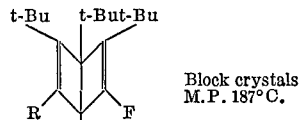

Block crystals M.P. 187°C.

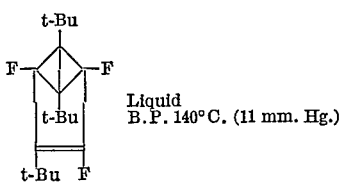

Liquid B.P. 140°C. (11 mm. Hg.)

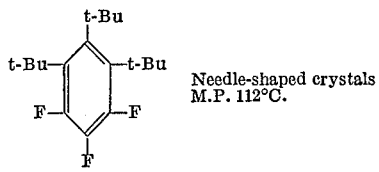

Needle-shaped crystals M.P. 112°C.

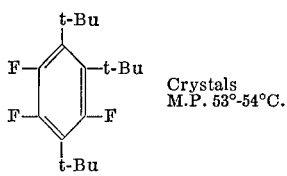

Crystals
M.P. 53°-54°C.

The above compounds were identified by elemental analysis, molecular weight determination, infrared, ultraviolet, and nuclear magnetic resonance spectroscopy.

Compounds of Formula G can be considered as derivatives of the parent hydrocarbon tricyclo[2.1.1.0$^{5.6}$]-hex-2-ene, $C_6H_6$, having the structure:

(K)

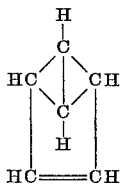

The compounds of Formula K can be prepared by subjecting benzene to high energy radiation, in which case the molecules have relatively short lifetimes, or by trimerizing acetylene at low temperatures. The compound of Formula K is useful as a liquid hydrocarbon solvent or can be converted to benzene by heating (thermal rearrangement).

What is claimed is:
1. Compounds represented by the formula:

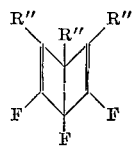

wherein R″ is a monovalent hydrocarbon group having from one to 18 carbon atoms.

2. The compound having the formula:

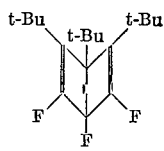

References Cited

Viehe et al., Chem. Abstracts, 62, 1583d, e (1965).

DANIEL D. HORWITZ, Primary Examiner

U.S. Cl. X.R.

260—650